United States Patent
Park et al.

(10) Patent No.: US 7,618,256 B2
(45) Date of Patent: Nov. 17, 2009

(54) SEAL HARDENING FURNACE OF LIQUID CRYSTAL DISPLAY DEVICE HAVING RACK BAR

(75) Inventors: Moo-Yeol Park, Gyeonggi-Do (KR); Jong-Won Kim, Gyeonggi-Do (KR)

(73) Assignee: LG. Display Co., Ltd., Seoul (KR)

( * ) Notice: Subject to any disclaimer, the term of this patent is extended or adjusted under 35 U.S.C. 154(b) by 640 days.

(21) Appl. No.: 11/169,219

(22) Filed: Jun. 28, 2005

(65) Prior Publication Data

US 2006/0141807 A1    Jun. 29, 2006

(30) Foreign Application Priority Data

Dec. 29, 2004    (KR) .................. 10-2004-0115561

(51) Int. Cl.
*G02F 1/13* (2006.01)
*F27D 5/00* (2006.01)

(52) U.S. Cl. .................. 432/258; 432/162; 349/187; 211/169.1; 211/126.15

(58) Field of Classification Search .......... 432/162, 432/258, 259, 261; 211/41.18, 111, 118, 211/119.004, 126.6, 126.7, 126.12, 126.15, 211/128.1, 129.1, 130.1, 149, 169.1, 175, 211/189; 220/278, 279, 592.02; 34/218, 34/237, 239, 240; 217/7, 13; 349/187; 254/95, 254/105, 112, 113, 116, 118

See application file for complete search history.

(56) References Cited

U.S. PATENT DOCUMENTS

| | | | | | |
|---|---|---|---|---|---|
| 3,739,921 | A | * | 6/1973 | Schmidt | 211/194 |
| 4,227,874 | A | * | 10/1980 | Nugent | 432/261 |
| 4,249,079 | A | * | 2/1981 | Thomas | 378/176 |
| 5,007,788 | A | * | 4/1991 | Asano et al. | 414/416.09 |
| 5,085,608 | A | * | 2/1992 | Turner | 446/75 |
| 6,195,149 | B1 | * | 2/2001 | Kodera et al. | 349/187 |
| 6,435,253 | B1 | * | 8/2002 | Steeves et al. | 160/135 |
| 6,746,239 | B2 | * | 6/2004 | Takahashi | 432/121 |
| 6,959,502 | B2 | * | 11/2005 | Nakamura et al. | 34/233 |
| 7,131,893 | B2 | * | 11/2006 | Shin | 451/43 |
| 7,163,110 | B2 | * | 1/2007 | Huang et al. | 211/41.18 |
| 7,336,334 | B2 | * | 2/2008 | Jung et al. | 349/154 |
| 2002/0117270 | A1 | * | 8/2002 | Steeves et al. | 160/135 |
| 2003/0093930 | A1 | * | 5/2003 | Stankiewicz | 38/143 |

* cited by examiner

*Primary Examiner*—Gregory A Wilson
(74) *Attorney, Agent, or Firm*—Brinks Hofer Gilson & Lione

(57) ABSTRACT

A seal hardening furnace is presented in which seal lines in a liquid crystal display panel are hardened. The seal hardening furnace includes a cassette having a rack bar structure. The rack bar structure has rack bars for supporting the substrate along one direction and rack bar supports at ends of the rack bars that support the rack bars. The rack bars have air discharge openings therein. An air injecting passage is connected to the rack bar supports. An air supply unit supplies air through the air injecting passage and through the discharge openings to support the substrate thereon.

10 Claims, 7 Drawing Sheets

SEAL HARDENING FURNACE OF LIQUID CRYSTAL DISPLAY DEVICE HAVING RACK BAR

PRIORITY CLAIM

The present application claims the benefit of priority to Korean Application 2004-115561, filed on Dec. 29, 2004, which is herein incorporated by reference in its entirety.

FIELD OF THE INVENTION

The present invention relates to a seal hardening furnace of a liquid crystal display device, and particularly, to a structure of a rack bar within a seal hardening furnace.

DESCRIPTION OF THE RELATED ART

In general, a liquid crystal display device includes a liquid crystal display panel having unit pixels formed thereon in a matrix configuration, a driving circuit unit for supplying a scanning signal and an image signal to the liquid crystal display panel, and a back-light unit for supplying light to the liquid crystal display panel.

In particular, the liquid crystal display panel is equipped with an upper color filter substrate, a lower array substrate, and a liquid crystal layer filled in a position between the two substrates. The two substrates, namely, the color filter substrate and the array substrate are attached to each other by seal lines formed at their edges.

Hereinafter, a process for fabricating the liquid crystal display panel will briefly be described. The process for fabricating the liquid crystal display panel includes forming the array substrate on which a thin film transistor used as a switching device is formed; forming the color filter substrate on which a color filter layer for rendering information with color; forming seal lines on one certain substrate of the two substrates; attaching the two substrates by the seal lines; and cutting the attached substrates into unit liquid crystal display panels. The liquid crystal layer may be formed after performing the cutting process when adopting an injecting method. Otherwise, the process for forming the liquid crystal layer may be carried out at the same time as the attaching process is ongoing when adopting a dispensing method.

In general, a plurality of liquid crystal display panels are formed on a mother substrate so as to improve productivity. When a plurality of array substrates and color filter substrates are formed on one mother substrate, one of the two substrates is coated by a sealant which is made of thermosetting resin to thereafter heat up for attaching an upper substrate (the color filter substrate) and a lower substrate (the array substrate).

The process for attaching the upper substrate and the lower substrate of the liquid crystal display panel will now be explained in more detail with reference to FIGS. 1A and 1B.

As shown in FIGS. 1A and 1B, the array substrate and the color filter substrate are substantially attached by heating them within a chamber 10, using an attaching device.

When the array substrate and the color filter substrate are completely formed, seal lines are formed at edges of one of the two substrates. Thereafter, as shown in FIG. 1A, an upper substrate 8b and a lower substrate 8a of the liquid crystal display panel are fixed, respectively, to a lower stage 2 and an upper stage 4 within the chamber 10.

After fixing the two substrates, the upper stage 4 descends to thereby provide a uniform pressure on the lower substrate 8a. At this time, the upper substrate 8b and the lower substrate 8a are attached to each other by the seal lines due to the provided pressure.

The attaching process is carried out within a chamber 10 which is heated up to a certain temperature. However, after completing the attaching process, the substrate undergoes a hardening process. While hardening it, a pressure in an inner space of the liquid crystal display panel which is formed by the attachment is different from an air pressure of the hardening chamber. As a result, the pressure acts upon the seal lines so as to make holes in the seal lines.

Therefore, in order to temporarily harden the seal lines during the attaching process, a UV (Ultra-Violet) hardening process for irradiating the UV radiation on the seal lines is carried out. Hence, the chamber in which the attaching process is performed is further provided with a UV lamp for generating the UV radiation.

Accordingly, after completely carrying out the attaching process within the chamber 10, a primary hardening for the seal lines by the UV radiation is performed.

Afterwards, a secondary hardening for the liquid crystal display panel for which the primary hardening has been performed is carried out in a seal hardening furnace, thereby completing the attaching process. The second seal hardening is performed in a separate chamber from the chamber in which the primary hardening is performed.

The secondary hardening is substantially carried out within the chamber for a predetermined time in a heated state. The chamber has a cassette therein which is equipped with a rack bar, so that the seal hardening for the plurality of substrates can be performed.

With reference to FIGS. 2A and 2B, structures of the cassette and the rack bar within the chamber in which the seal hardening is carried out will now be described. FIG. 2A is a perspective view illustrating a cassette within a related art seal hardening furnace and FIG. 2B is a front view thereof.

With reference to FIGS. 2A and 2B, a cassette 200 within a seal hardening furnace (not shown) is composed of a plurality of layers for placing a plurality of substrates 204 thereon. A plurality of rack bars 201 for supporting the substrate (not shown) is installed on each layer in a Y axis direction thereof, and a rack bar support 202 for supporting the rack bars 201 is installed on a front end of the rack bar 201 in an X axis direction on each layer. Therefore, the front end of the rack bar 201 is positioned on an upper surface of the rack bar support 202, and a rear end thereof is installed on a rear surface of the cassette 200 and fixed by a second rack bar support 205 which is installed in a Z axis direction.

The rack bars 201 have certain heights and are installed with a certain interval to thereby support the substrate loaded thereon. Accordingly, uniform spaces 203 are formed between the rack bars 201 adjacent to each other, and fingers 206 of a robot arm are introduced into and drawn out through the spaces 203 to load and unload the substrate.

However, in order to harden the seal lines formed of thermosetting resin, the substrate is typically placed in the seal hardening furnace for a long time in a high temperature state. At this time, stain is generated on the substrate region in contact with the rack bars 201, which causes defects in the liquid crystal display panel.

In particular, due to the large-size liquid crystal display panel being heavy, a more substantial amount of strain may be generated in the region where the substrate contacts the rack bars 201.

SUMMARY OF THE INVENTION

By way of introduction only, a seal hardening furnace is provided that is capable of mitigating stain generation in a liquid crystal display panel during a hardening process when fabricating a liquid crystal display device. More particularly, stain generation in a liquid crystal display panel is mitigated while hardening seal lines by improving a cassette structure in which the liquid crystal display panel is loaded in a seal hardening furnace.

In one embodiment, a seal hardening furnace comprises a cassette including rack bars for supporting a substrate and having discharge openings therein, a first rack bar support for supporting the rack bars in an X axis direction, an injecting passage connected to the first rack bar support, and an air supply unit for supplying air through the injecting passage.

According to another embodiment of the present invention, there is provided a seal hardening furnace comprising first rack bars for supporting the substrate, second rack bars connected to the first rack bars, a first rack bar support for supporting the first rack bars in an X axis direction, and a second rack bar driving unit installed at a rear end of each of the second rack bars.

In another embodiment, a seal hardening furnace comprises a cassette including rack bars, a rack bar support disposed at an end of the rack bars that supports the rack bars, and a secondary support mechanism that increases uniformity of support for substrates disposed on the rack bars beyond support provided by the rack bars alone; and a heating unit for heating the substrate. The secondary support mechanism comprises, for example, a gas discharge mechanism that provides gaseous support for the substrate such that the substrate is disposed over the rack bars without contacting the rack bars and/or a secondary rack bar movably connected to each of the rack bars such that a contact area of a surface of the rack bars and the substrate is extended when the secondary rack bar is in an extended position.

The foregoing and other features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1A:
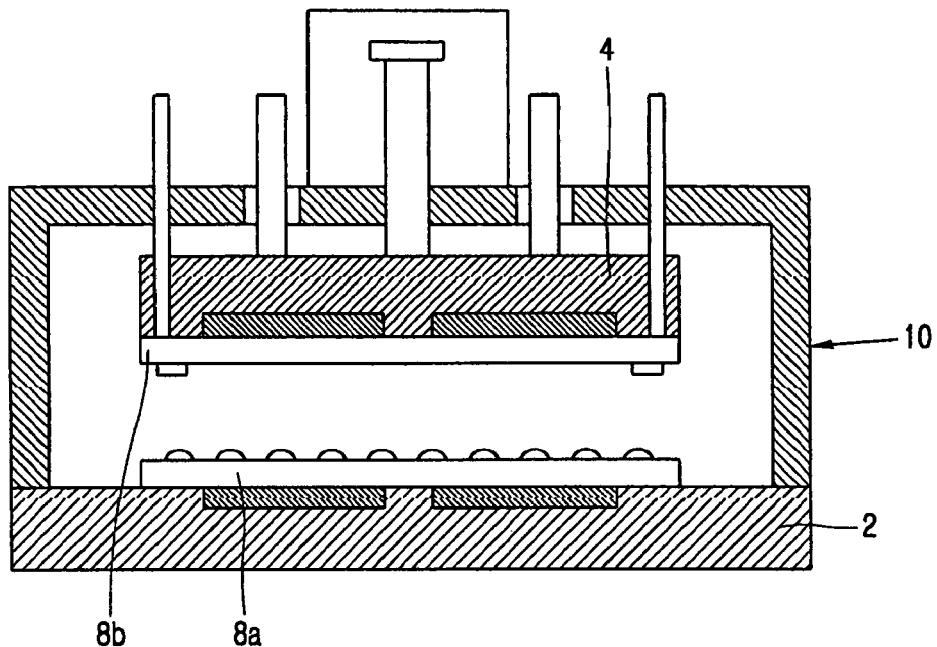
FIGS. 1A and 1B illustrate an inside of a chamber of an attaching device of a related art liquid crystal display panel.
Figure 1B:
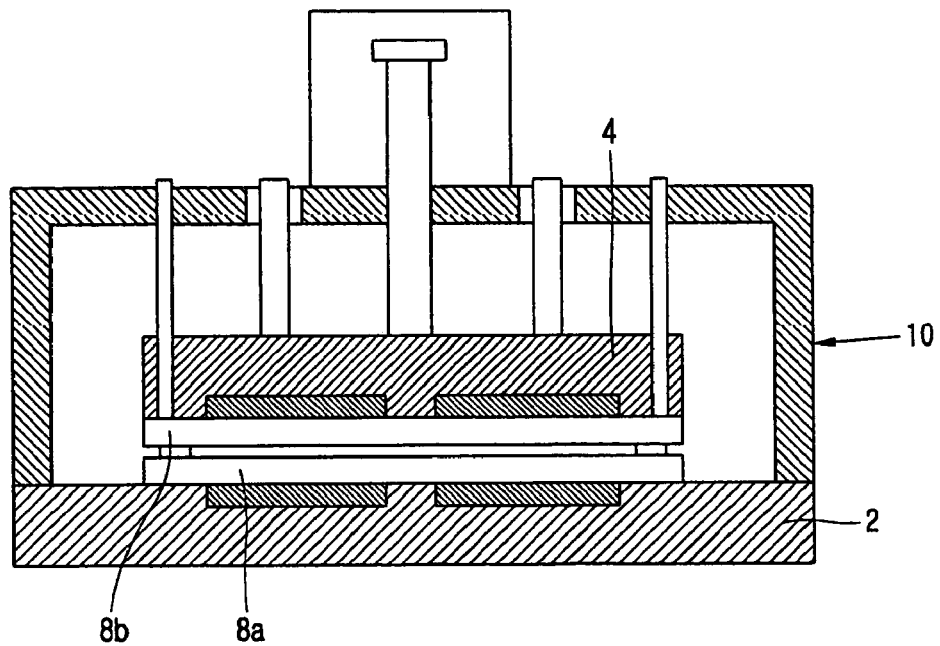
Figure 2A:
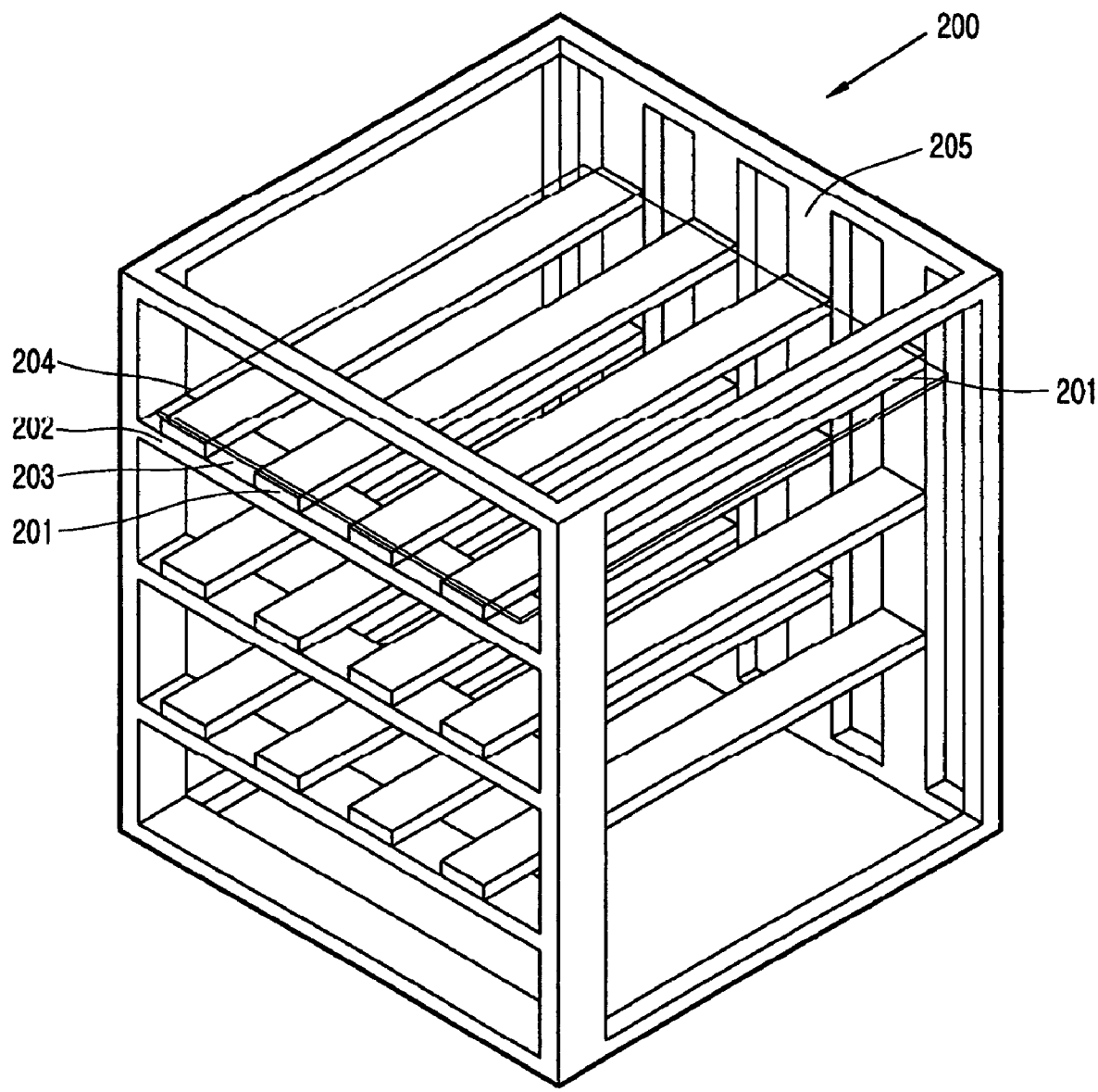
FIGS. 2A and 2B are perspective view and plane view, respectively, showing a cassette structure within a seal hardening furnace.
Figure 2B:
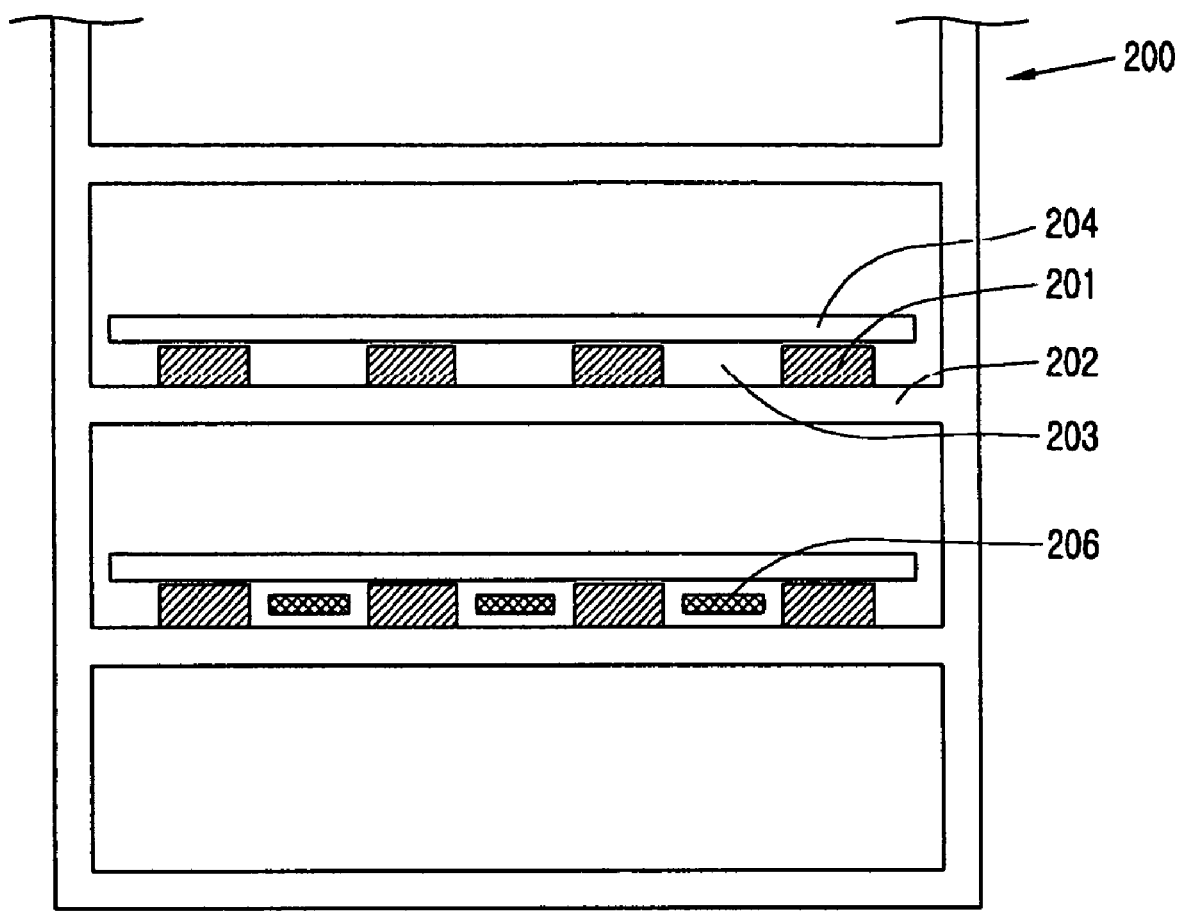

Reference will now be made in detail to the preferred embodiments of the present invention, examples of which are illustrated in the accompanying drawings.

With increasing sizes of liquid crystal display devices, the liquid crystal display panel has increased in weight to be as heavy as several kilograms. In particular, the liquid crystal display panel is formed by attaching an upper substrate and a lower substrate and forming a liquid crystal layer therebetween. The two substrates are attached by a sealant formed of thermosetting resin. The attaching process using the sealant is typically carried out within a chamber. After performing the attaching process, a separate process for hardening the sealant is carried out. The hardening process is performed within a heat hardening furnace. The liquid crystal display panel is hardened in a high temperature state by being loaded on a cassette of the heat hardening furnace.

The hardening process is carried out for about a hour under a temperature of 100~120° C. Because of the heavy weight of the liquid crystal display panel, while undergoing the seal hardening, a column spacer is pressed down at a region where rack bars of the cassette for supporting the liquid crystal display panel are contact with the liquid crystal display panel, thereby resulting in a screen defect such as a stain on the liquid crystal display panel. The screen defect is caused by the column spacer being pressed down by a load of the liquid crystal display panel during the seal hardening process.

In order to prevent the column spacer from being pressed by the load of the liquid crystal display panel although the seal hardening is carried out for a long time, gas, such as air, is injected into a contact surface between the liquid crystal display panel and the rack bar to thereby lift up the liquid crystal display panel from the rack bar, or a contact area between the liquid crystal display panel and the rack bar is widened by changing the rack bar structure. As a result, the load of the liquid crystal display panel is more uniformly dispersed to thereby prevent the column spacer from being pressed.

Hereinafter, a seal hardening furnace for hardening a sealant of a liquid crystal display panel will be described with reference to FIGS. 3A and 3B.

First, before explaining the seal hardening furnace, an attaching process for the liquid crystal display panel will now be explained.

When an array substrate and a color filter substrate which are fabricated by a separate process are delivered, seal lines formed of thermosetting resin are formed on one of the two substrates.

For instance, the seal lines may be formed on four edges of the color filter substrate by a seal line dispenser. Afterwards, the color filter substrate and the array substrate having the seal lines thereon are aligned each other, and are heated and pressurized in a vacuum chamber, thereby being attached to each other. After attaching the two substrates to each other, a seal hardening for the liquid crystal display panel is carried out in a separate chamber. However, since the seal hardening is performed under an atmospheric pressure, the seal lines may be destroyed by an air pressure difference between the seal hardening chamber under the atmospheric pressure circumstance and a vacuum space within the liquid crystal display panel formed by the seal lines. Hence, after completing the attaching process, the seal lines are temporarily hardened by UV (Ultra-Violet) radiation source within the chamber in which the attaching process is ongoing (it is referred to as a UV cure). Therefore, the sealant contains a UV hardener which is hardened by the UV radiation.

Once primarily hardening the seal lines by irradiating the UV radiation, the liquid crystal display panel, which has not been completely hardened by the primary hardening, is transferred to a seal hardening furnace which is a separate chamber, and the non-hardened seal lines thereof are then hardened.

The chamber in which the seal hardening is carried out maintains a temperature of about 120° C. and the seal lines are hardened in the chamber for about one hour. Moisture of the seal lines formed of thermosetting resin is removed therefrom in a high temperature state for a long time so that the seal lines are hardened.

The seal hardening furnace is provided with a cassette 300 for storing a plurality of liquid crystal display panels for which the seal hardening process is carried out. The cassette structure will now be explained.

Figure 3A:
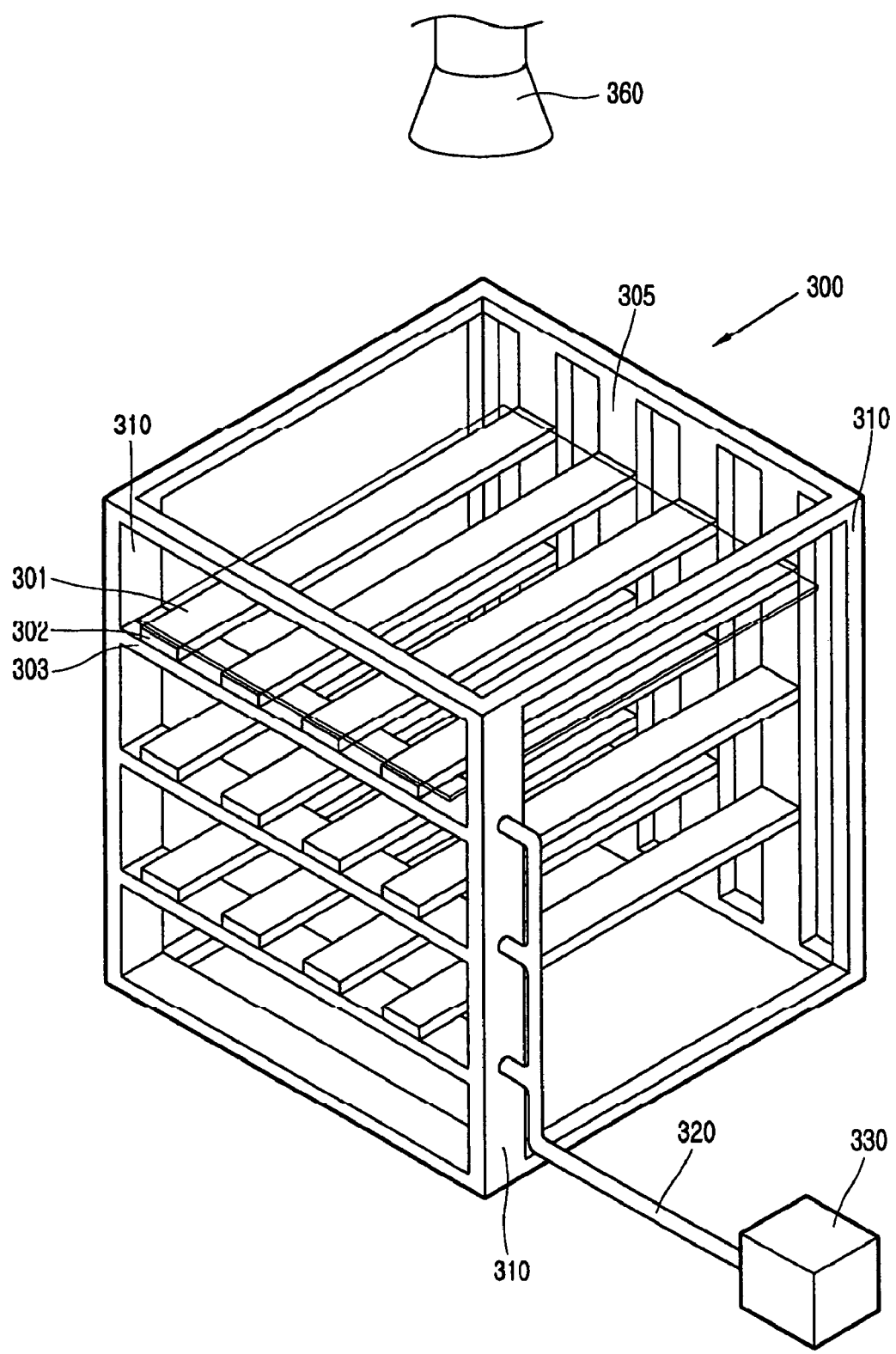
FIGS. 3A and 3B are perspective view and plane view, respectively, showing a cassette structure within a seal hardening furnace in accordance with a first embodiment of the present invention.
Figure 3B:
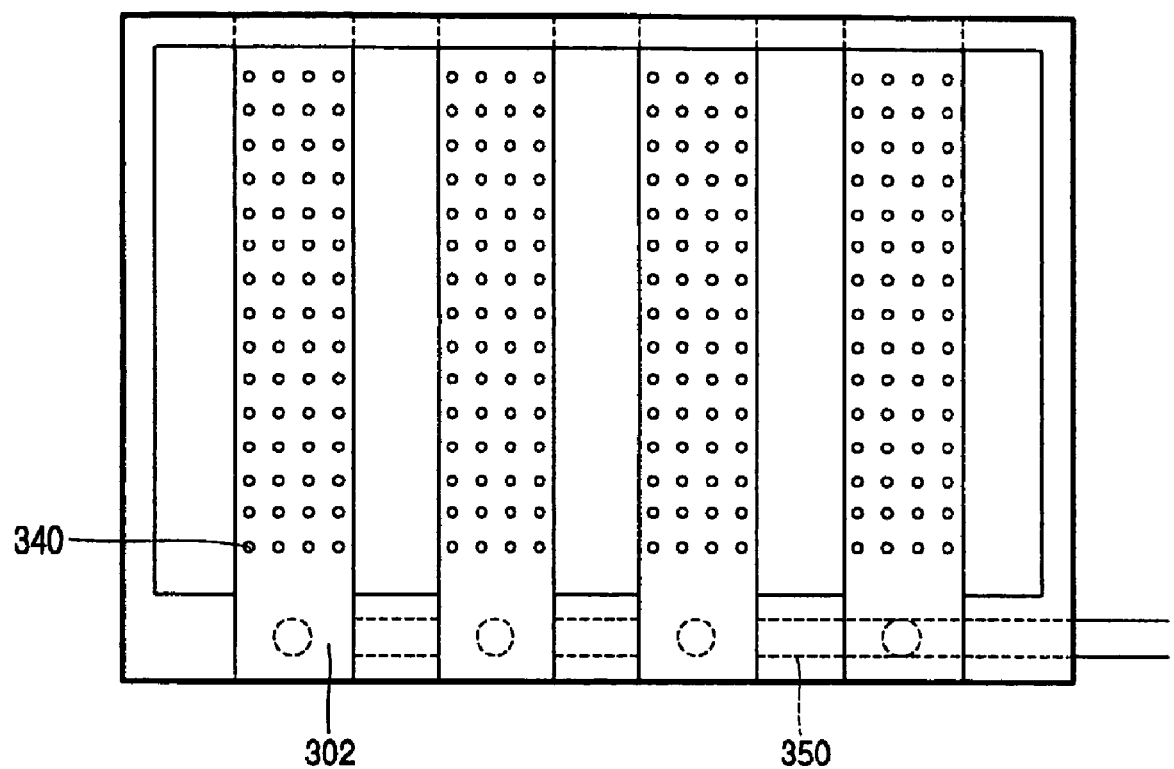

With reference to FIGS. 3A and 3B which are a perspective view and a plane view, respectively, showing a substrate storing cassette within a seal hardening furnace according to a first embodiment of the present invention, the cassette 300 includes a plurality of frames 310 composing a cuboid cassette body, a first rack bar support 303 installed in an X axis direction, for connecting front frames of the cassette, a second rack bar support 305 installed at a rear end of the cassette in a Z axis direction, a plurality of rack bars 302 of which front ends are positioned on the first rack bar support 303 and rear ends are fixed to the second rack bar support 305, and a substrate 301 loaded on the rack bars 302 and for which a seal hardening process is to be carried out.

The rack bar 302 has a certain height and its upper surface has a flat bar shape. Because the rack bars 302 are installed with a uniform interval on the first rack bar support 303, spaces are formed between the rack bars 302 adjacent to each other. Fingers of a robot arm for loading and unloading the substrate 301 on the rack bars 302 are thusly introduced into and drawn out through the spaces.

A plurality of air discharge openings 340 is distributed in an upper surface of each rack bar 302 in a uniform density. A passage for supplying air is installed inside each rack bar 302 so as to eject air through the air discharge openings 340. Therefore, the inside of the rack bar 302 may be formed in a shape of a cavity or a pipe connected to the air discharge openings 340 may be formed in the rack bar 302.

Furthermore, the rack bar 302 and the first rack bar support 303 are connected to each other. A pipe 350 for injecting air into the rack bar 302 through the first rack bar support 303 is installed in the first rack bar support 303. The pipe of the rack bar 302 and the pipe 350 of the first rack bar support 303 are connected to each other.

An air injecting passage 320 for supplying air to the first rack bar support 303 is formed at a side surface of the first rack bar support 303. An air generator 330 for supplying air is further installed at one end of the air injecting passage 320.

The cassette 300 is configured with several layers to thereby heat up a plurality of substrates at the same time. The first rack bar support 303 and the rack bars 302 are installed at each layer, and the substrate is loaded on an upper surface of the rack bars 302. Each first rack bar support 303 is connected to the air injecting passage 320 for receiving air supplied thereto.

Because the seal hardening furnace is operated at a temperature of about 100~120° C., air supplied by the air generator 330 is heated up to a predetermined temperature. Therefore, the air generator 330 may further have a heating unit (not shown) therein for heating the air.

An air outlet 360 for discharging the supplied air at a uniform speed is further installed at one end of the seal hardening furnace, thereby uniformly maintaining an air pressure in the seal hardening furnace.

It will now be described how to harden the seal lines on a substrate by using the seal hardening furnace with such structure.

Seal lines of a liquid crystal display panel are primarily hardened by an attaching process within a chamber and a UV hardening process.

Afterwards, the liquid crystal display panel of which seal lines have primarily been hardened is transferred to a seal hardening furnace according to the present invention for hardening the seal lines completely. The liquid crystal display panel is transferred by a robot arm. Fingers of the robot arm are introduced into and drawn out through spaces formed between the rack bars adjacent to each other to thereby load the substrate on the rack bars.

Next, the seal hardening furnace is gradually heated up to about 120° C. At this time, air generated by the air generator 330 passes through the air injecting passage 320, the first rack bar support 303, and the rack bars 302 in sequence, to thereafter be sprayed out through the air discharge openings 340. The substrate 301 is then lifted from the rack bars 302 by the sprayed air by a certain height. A pressure of the sprayed air is optimized according to a weight of the substrate to be loaded. A height which the substrate 301 is lifted up may be less than several millimeters, which is enough if the rack bar and the substrate are prevented from being contact therewith only while the seal hardening process is carried out.

The seal hardening process is carried out for about a hour. While performing the seal hardening, air is continuously injected inwardly. While this, the air outlet 360 installed at one side of the seal hardening furnace sprays air outwardly at a uniform speed to thereby maintain a pressure within the seal hardening furnace at a uniform level.

When all of the seal lines on the substrate 301 are completely hardened, the air generator 330 stops its operation and the substrate 301 is unloaded from the seal hardening furnace by the robot arm.

Therefore, once hardening all of the seal lines by using the seal hardening furnace with the aforementioned structure, while the seal lines are hardened, the substrate 301 does not directly contact the rack bars 302, and accordingly it is possible to mitigate stain in the liquid crystal panel caused by contact between the rack bar and the substrate 301.

In the embodiment, the substrate 301 does not contact the rack bars while the seal lines are hardened. In a second embodiment described herebelow, while the seal lines are hardened, an area in which the rack bars 302 contact the substrate 301 is widened, and accordingly the load of the substrate is uniformly dispersed to thereby prevent the stain from being generated.

A basic configuration of a cassette installed in the seal hardening furnace in accordance with the second embodiment of the present invention is similar to that of the first embodiment. That is, a cassette according to the second embodiment includes a plurality of frames composing a cuboid cassette body, a first rack bar support 303 installed in an X axis direction, for connecting frames positioned at a front surface of the cassette, a second rack bar support 305 installed at a rear end of the cassette in a Z axis direction, a plurality of first rack bars 401 each of which front end is positioned on the first rack bar support 303 and rear end is fixed to the second rack bar support 305, a plurality of second rack bars 402 connected to the first rack bars 401, a driving unit for folding or unfolding the second rack bars 402 from the first rack bars 401, and a substrate loaded on the first and second rack bars 401 and 402.

Moreover, the second rack bars 402 are connected to the first rack bars 401, respectively, by a connection member 403 such as hinges. The driving unit is connected to a rear end of the second rack bar 402 to thereby fold or unfold the second rack bar 402 from the first rack bar 401 by a horizontal motion.

Hereinafter, main parts of a rack bar structure in accordance with the second embodiment will be described with reference to FIGS. 4A and 4B.

Figure 4A:
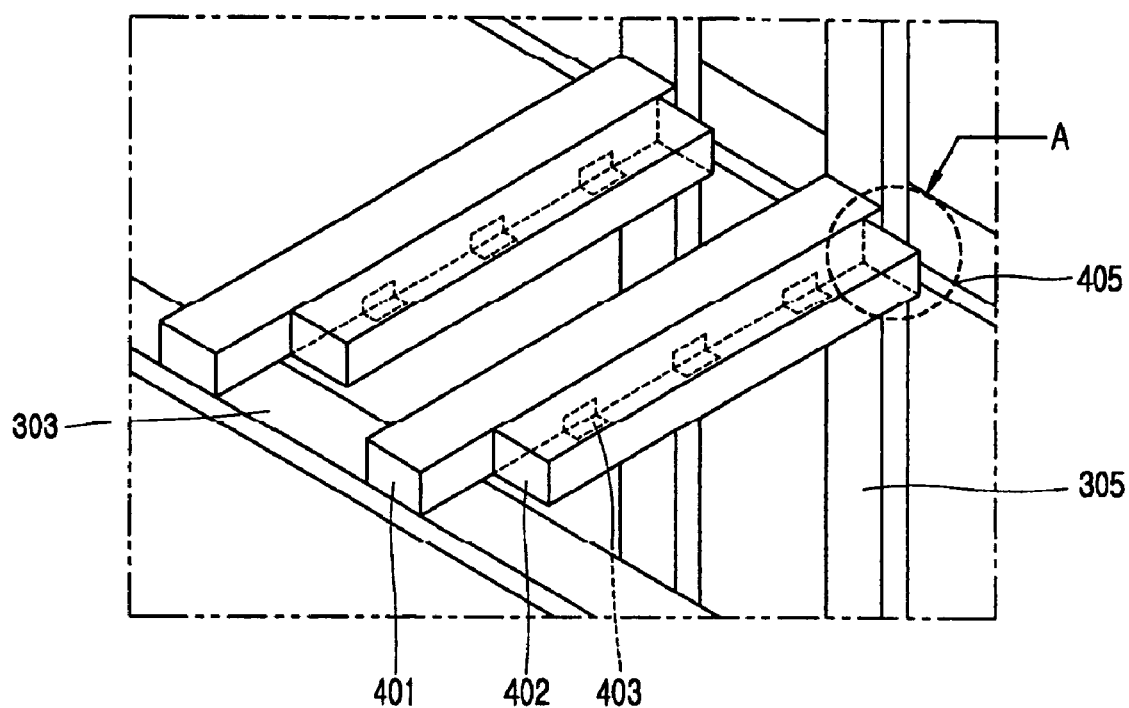
FIGS. 4A to 4D illustrate a rack bar structure and an operation thereof in accordance with a second embodiment of the present invention.

As shown in FIG. 4A, a front end of each first rack bar 401 according to the second embodiment of the present invention is positioned on the first rack bar support 303 for connecting frames (not shown) configuring pillars of the cassette in an X axis direction. The first rack bar 401 is then extended toward a Y axis direction, and accordingly a rear end thereof is installed at a rear end of the cassette and fixed to the second rack bar support 305 which is installed in a Z axis direction. The first rack bar 401 has a certain height and is formed on the first rack bar support 303 with the same interval. Hence, the first rack bars 401 have spaces formed therebetween. Fingers of the robot arm are thusly introduced into and drawn out through the spaces to load or unload the substrate.

Each first rack bar 401, on the other hand, is connected to each second rack bar 402 by a connection member. When the second rack bar 402 is folded, the second rack bar 402 contacts a rear surface of the first rack bar 401. When the second rack bar 402 is unfolded, the second rack bar 402 is positioned at a space between the first rack bars 401. Hence, the contact area between the rack bars and the substrate loaded on rack bars can be widened.

Therefore, the second rack bar 402 is extended toward a Y axis direction to be connected to the first rack bar 401 by using a connection member such as hinges which can be folded or unfolded.

The second rack bar 402 is formed to have a length shorter than that of the first rack bar 401, so that the second rack bar 402 is connected to the first rack bar 401 so as to be folded or unfolded. That is, when the second rack bar 402 is unfolded, the first rack bar support 303 acts as an obstacle. Accordingly, in order to unfold the second rack bar 402 without any interruption by the first rack bar support 303, the front end of the second rack bar 402 is positioned with a gap from the first rack bar support 303.

Furthermore, the rear end of the second rack bar 402 is also positioned with a gap from the second rack bar support 305, thereby being folded or unfolded without any interruption by the second rack bar support 305.

The first rack bar 401 and the second rack bar 402 are connected to their rear surfaces by the connection member 403 such as hinges, and accordingly the second rack bar 402 can be folded. The second rack bar 402 is unfolded and takes up a space formed between two first rack bars 401 adjacent to each other. According to this, the contact area between the substrate 301 and the rack bars can be widened. As a result, the load of the substrate can effectively be dispersed into the rack bars.

Moreover, when the second rack bar 402 is folded on the rear surface of the first rack bar 401, fingers of the robot arm are introduced into and drawn out through the spaces formed between first rack bars adjacent to each other to thereby load and unload the substrate 301.

On the other hand, a driving unit for operating the second rack bar 402 is installed at a rear end of the second rack bar 402.

An operation of the second rack bar 402 will now be explained with reference to FIG. 4B.

Figure 4B:
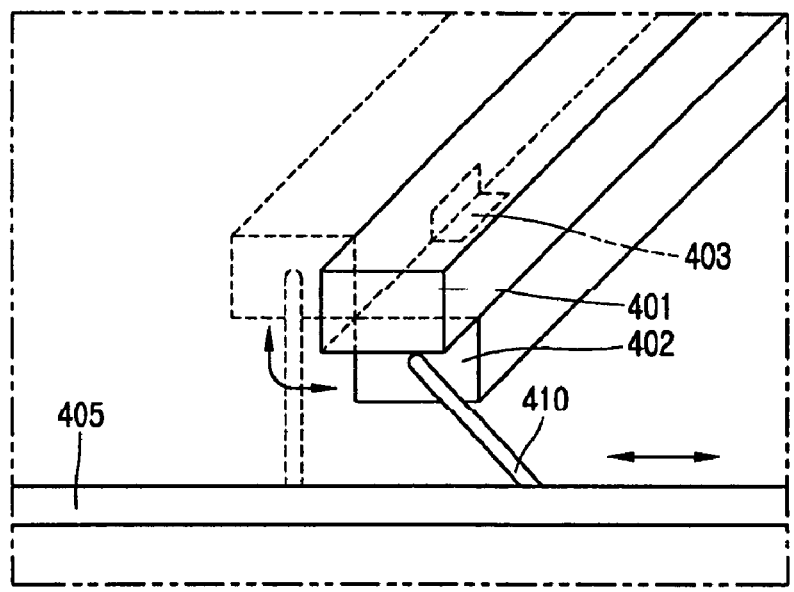

FIG. 4B shows a rear end of the second rack bar 402, the A region of the FIG. 4A, and particularly shows a state in which the second rack bar 402 is folded on the rear surface of the first rack bar 401. A second rack bar driving axis 405 is installed at a rear end of the second rack bar 401 in an X axis direction. The rear end of the second rack bar 402 is connected to the driving axis 405 by means of a sub-driving axis 410. Accordingly, when the driving axis 405 reciprocates in an X axis direction, the second rack bar 402 is unfolded or folded from the rear surface of the first rack bar 401 to the side surface thereof by the sub-driving axis 410.

When the substrate is loaded on the rack bars by the robot arm, the second rack bar 402 is folded on the rear surface of the first rack bar 401. Afterwards, after the robot arm is taken away, when a sealant on the substrate is hardened, the second rack bar 402 is unfolded to thereby support the substrate together with the first rack bar 401.

Therefore, when the sealant is hardened, the substrate is supported by the first and second rack bars, and accordingly the supported area thereof is widened. As a result, the load of the substrate is uniformly dispersed into the first and second rack bars, which results in reducing a defect caused by a column spacer being pressed by the load of the substrate to thusly generate stain.

Figure 4C:
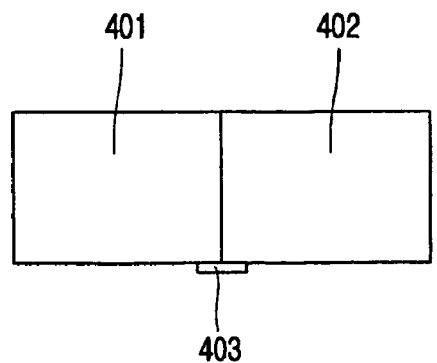
Figure 4D:
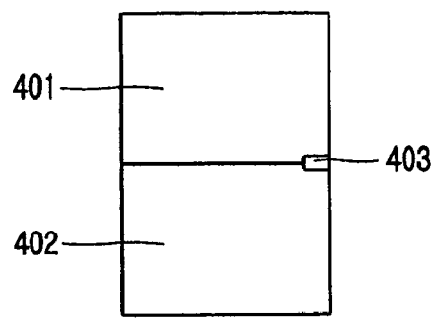

FIG. 4C is a front sectional view showing a state in which the first and second rack bars are unfolded, and FIG. 4D is a front sectional view showing a state in which the first and second rack bars are folded.

Figure 5:
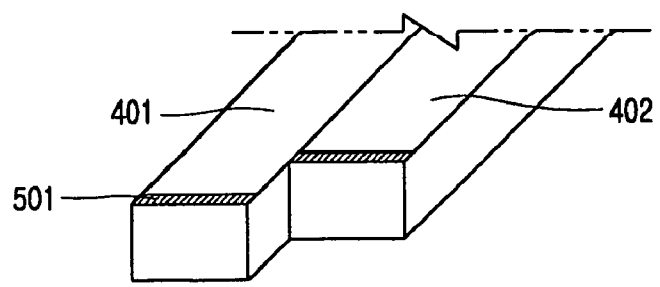
FIG. 5 illustrates a rack bar structure equipped with a substrate fixing member according to the present invention.

Referring to FIG. 5, on the other side, a substrate fixing unit 501 which is formed of such rubber for preventing the substrate to be loaded from being slid is equipped on front and rear ends of the first rack bar 401 and the second rack bar 402. As a result, the substrate can be prevented from being slid during the seal hardening process.

As described above with reference to the embodiments, in the seal hardening furnace according to the present invention, the rack bars being contact with the substrate are provided with the air discharge openings, or folding-type rack bars are provided, thereby preventing stain from being generated on the liquid crystal display penal while performing a sealant hardening process which is performed in a heated state.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A seal hardening furnace comprising:
   a plurality of first rack bars for supporting a substrate, the first rack bars parallel to one another;
   a plurality of second rack bars making pairs with the plurality of first rack bars, wherein when the second rack bar is unfolded, a contact area where the first and second rack bars contact the substrate is increased;
   a first rack bar support for supporting a front end of the first rack bars;

a second rack bar support for supporting a rear end of the first rack bars;

a first driving axis connected to the rear end of the second rack bar, for folding or unfolding the second rack bar from the first rack bar by reciprocating in an X axis direction; and a sub-driving axis for connecting the first driving axis and the second rack bar.

2. The seal hardening furnace of claim 1, wherein the first and second rack bars are connected to each other by a connection member.

3. The seal hardening furnace of claim 1, further comprising a substrate fixing member installed at front ends and rear ends of the first and second rack bars for preventing a substrate disposed on the first and second rack bars from sliding.

4. A seal hardening furnace comprising:

a cassette including rack bars;

a rack bar support disposed at an end of the rack bars that supports the rack bars; and a secondary support mechanism that increases uniformity of support for substrates disposed on the rack bars beyond support provided by the rack bars alone, wherein the secondary support mechanism comprises a secondary rack bar movably connected to each of the rack bars such that a contact area of a surface of the rack bars and the substrate is extended when the secondary rack bar is in an extended position.

5. The seal hardening furnace of claim 4, wherein the rack bars and secondary rack bars are connected to each other at multiple locations along a length of the rack bars and secondary rack bars.

6. The seal hardening furnace of claim 4, wherein the secondary support mechanism further comprises a secondary rack bar driving unit that moves each secondary rack bar into a compact position in which the secondary rack bar does not support the substrate and the extended position in which the secondary rack bar supports the substrate.

7. The seal hardening furnace of claim 6, wherein the secondary rack bar driving unit is disposed at an end of the secondary rack bars.

8. The seal hardening furnace of claim 4, further comprising a substrate fixing member disposed at at least one of opposing ends of the rack bars or at opposing ends of the secondary rack bars, the substrate fixing member preventing a substrate disposed on the rack bars or secondary rack bars from sliding.

9. The seal hardening furnace of claim 4, wherein when the secondary rack bars are in a compact position, the secondary rack bars contact a rear surface of the rack bars.

10. The seal hardening furnace of claim 4, wherein the rack bar support has a uniform width, and the secondary rack bars have a length shorter than a length of the rack bars such that when the secondary rack bars are in the extended position, the secondary rack bars do not contact the rack bar support.

* * * * *

UNITED STATES PATENT AND TRADEMARK OFFICE
CERTIFICATE OF CORRECTION

PATENT NO. : 7,618,256 B2 Page 1 of 1
APPLICATION NO. : 11/169219
DATED : November 17, 2009
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1147 days.

Signed and Sealed this

Nineteenth Day of October, 2010

David J. Kappos
*Director of the United States Patent and Trademark Office*